United States Patent [19]
van der Lely

[11] Patent Number: 5,784,994
[45] Date of Patent: Jul. 28, 1998

[54] APPARATUS AND METHOD FOR AUTOMATICALLY MILKING ANIMALS

[76] Inventor: Cornelis van der Lely, 7 Brüschenrain, CH-6300, Zug, Switzerland

[21] Appl. No.: 596,360
[22] PCT Filed: Jun. 29, 1995
[86] PCT No.: PCT/NL95/00230
§ 371 Date: Mar. 4, 1996
§ 102(e) Date: Mar. 4, 1996
[87] PCT Pub. No.: WO96/01040
PCT Pub. Date: Jan. 18, 1996

[30] Foreign Application Priority Data
Jul. 4, 1994 [NL] Netherlands .............. 9401113

[51] Int. Cl.$^6$ .............................. A01J 3/00
[52] U.S. Cl. ............... 119/14.08; 119/14.1; 119/14.14
[58] Field of Search ..................... 119/14.1, 14.02, 119/14.03, 14.08, 14.14, 14.18

[56] References Cited

U.S. PATENT DOCUMENTS

| | | | |
|---|---|---|---|
| 5,020,477 | 6/1991 | Dessing et al. | 119/14.08 |
| 5,042,428 | 8/1991 | van der Lely et al. | 119/14.08 |
| 5,056,466 | 10/1991 | Dessing et al. | 119/28 |
| 5,245,947 | 9/1993 | Oosterling et al. | 119/14.48 |
| 5,379,721 | 1/1995 | Dessing et al. | 119/14.08 |

FOREIGN PATENT DOCUMENTS

| | | |
|---|---|---|
| 0 360 354 A1 | 3/1990 | European Pat. Off. |
| 0 440 313 A1 | 8/1991 | European Pat. Off. |
| 0519544 | 12/1992 | European Pat. Off. |
| 0536837 | 4/1993 | European Pat. Off. |
| 0551960 | 7/1993 | European Pat. Off. |
| 0 306 579 A1 | 3/1989 | France. |
| PCT/NL93/00012 | 7/1993 | WIPO. |

OTHER PUBLICATIONS

International Search Report. for International Application PCT/NL95/00230. International Publication No. WO 96/011040. Publication date Jan. 18, 1996.

Primary Examiner—John G. Weiss
Assistant Examiner—David J. Cho
Attorney, Agent, or Firm—Penrose Lucas Albrigt

[57] ABSTRACT

Apparatus and method for automatically milking animals such cows confined within a milking compartment. The milking apparatus includes four robotic arms for individually emplacing and removing teat cups from the animal's teats and a separate robot arm for scanning the animal's teats to effect a computer-controlled emplacement of the teat cups on the animals' teats. The detector includes a laser which beams through a window on the detector carried by an omnidirecting member having a four-bar parallelogram member whereby beams are both horizontally and vertically movable. A cleaning member for spraying cleaning fluid on the detector window is mounted on the milking compartment so that the fluid is sprayed on the window. The longitudinal sides of the milking compartment have spray members for cleaning the teat cups which, when not used for milking, are under the spraying members. The robotic arms for emplacing and removing the teat cups each contain cords attached to the teat cups by which they are drawn tautly against the robotic arms for emplacement and removal and played out so that the animal can move within limits after the teat cups are emplaced. Tubes for milk and operating vacuum that connect to the teat cups are mounted on each longitudinal side of a milking compartment so as to be outboard thereof, the tubes being curved in roughly "U" configurations to permit the animal to move within limits without dislodging the teat cups from the animal's teats.

16 Claims, 5 Drawing Sheets

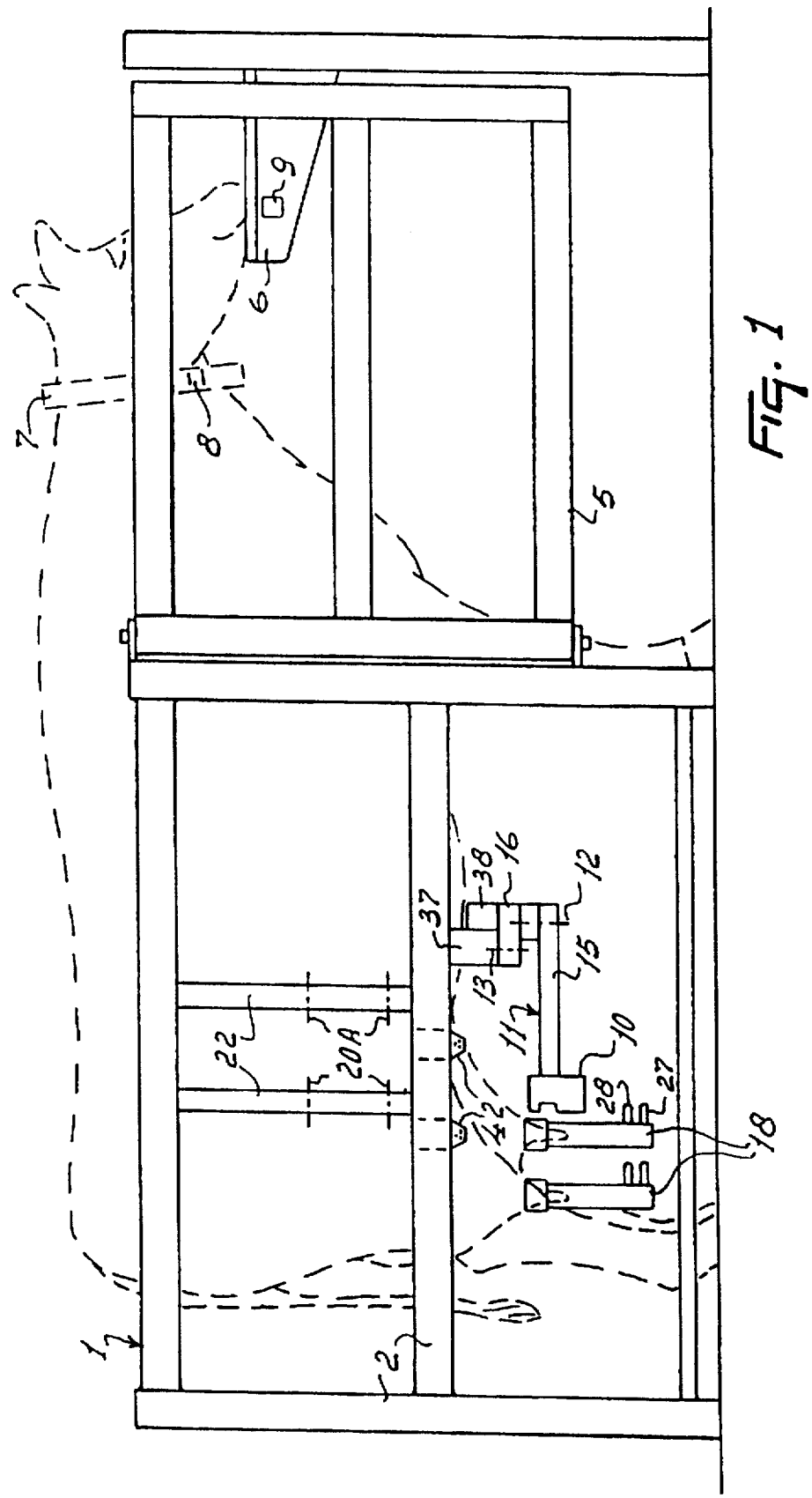

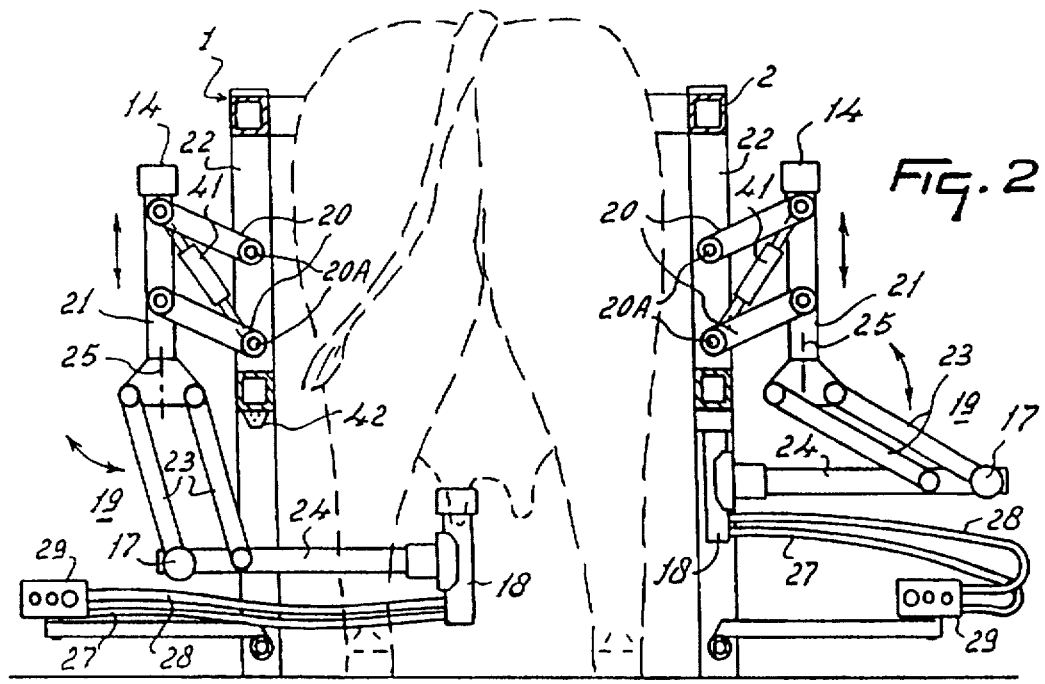
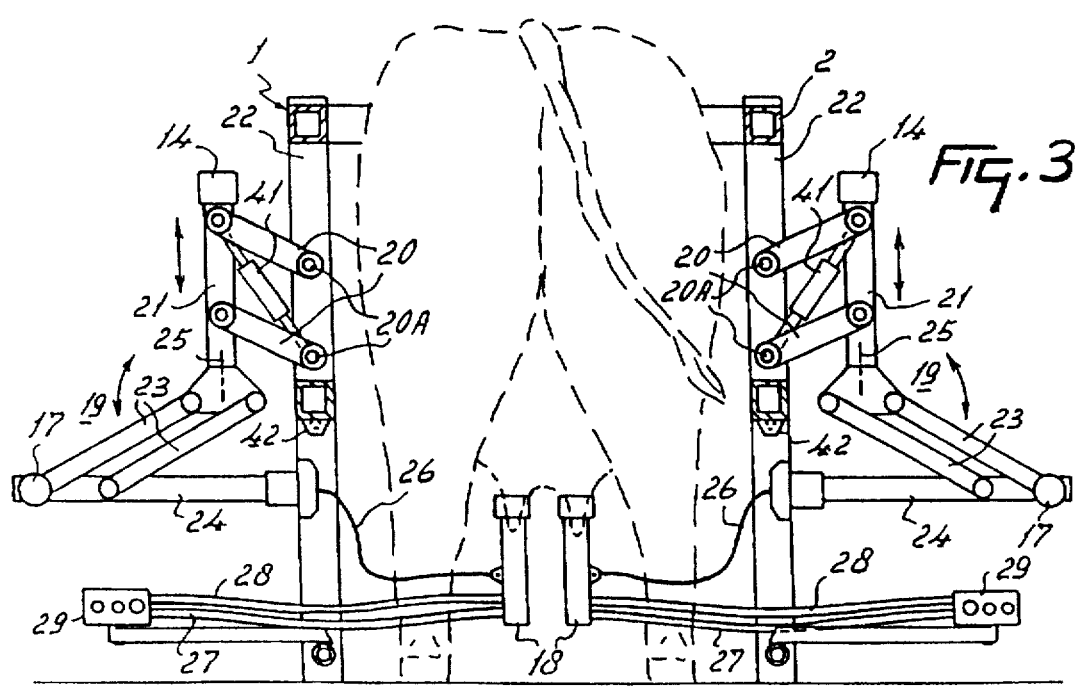

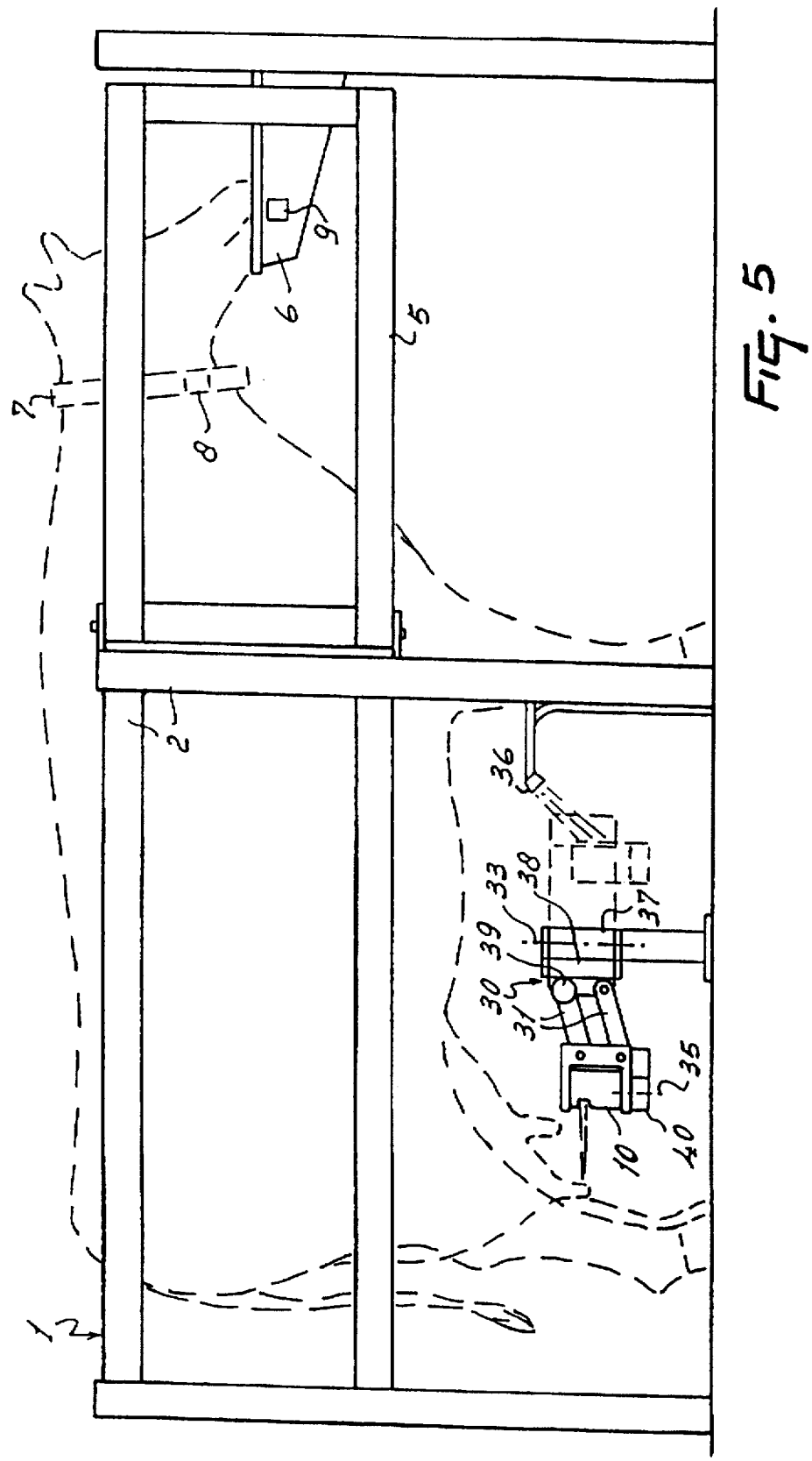

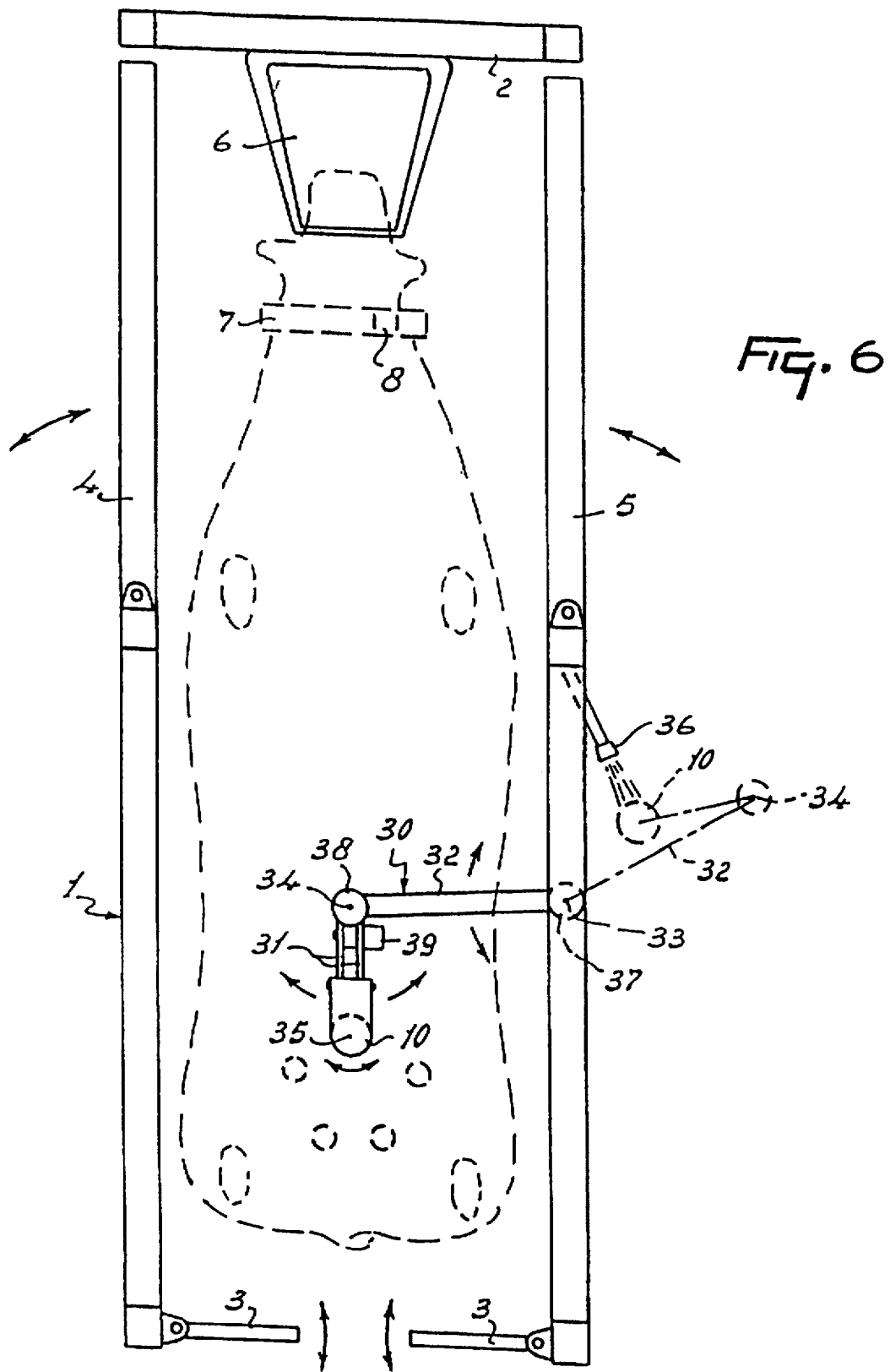

APPARATUS AND METHOD FOR AUTOMATICALLY MILKING ANIMALS

FIELD OF THE INVENTION

The present invention relates to an apparatus for automatically milking animals, such as cows, which includes milking compartments having milking robots for automatically connecting teat cups to the teats of the animals. In particular, the invention relates to an apparatus of this type which further includes a detector for determining the position of the teats.

SUMMARY OF THE INVENTION

Types of such apparatus are known but do not always work satisfactorily. The invention has as an object to improve types of apparatus of this nature. The apparatus is improved in that the detector is constructed in such a manner so that the detector's beams will be at different angles with respect to the teats of the animal to be milked. The invention also relates to an apparatus for automatically milking animals, such as cows, having one or more milking compartments which include one or more milking robots for automatically connecting teat cups to the teats of the animals and, in combination, further include a detector for determining the position of the teats, wherein the detector is arranged for performing a scanning motion in different directions. In this situation, the scanning beam of the detector can be positioned so that it can move up and down and to and fro. To make it possible to detect teats which are located at different heights above the floor of the milking compartment, the detector can perform a scanning motion through at least five centimeters, and preferably through approximately ten centimeters in the vertical direction. More in particular, for performing this motion in the vertical direction, the detector can be connected through the intermediary of a four-bar linkage to a robot arm. Apart from a movement in the vertical direction, the detector is also capable of rotation in a generally horizontal plane. To that end, the detector can be connected so as to be capable of rotating around a substantially vertical axis relative to the robot arm. The robot arm is preferably attached to a side of a milking compartment or arranged closely thereto. The robot arm is designed so that the detector can be moved to outside the milking compartment.

When the detector becomes contaminated, this may be to the detriment of the accuracy with which the position of the teats is determined, and it is possible that a positional determination cannot be made at all. To solve this problem, the apparatus may be fitted with a cleaning member for cleaning the detector. The invention, therefore, also relates to an apparatus for automatically milking animals, such as cows, having one or more milking compartments and one or more milking robots for automatically connecting teat cups to the teats of the animals, in further combination with a detector for determining the position of the teats and a cleaning member for cleaning the detector. This cleaning member is preferably arranged outside the milking compartment, and connected with the side framework of the milking compartment. More in particular when the detector comprises a laser, it has a window which can get dirty. For that reason, the cleaning member may be provided with spraying or blowing means or both for spraying a cleaning liquid or blowing air, respectively, against the window, thus cleaning the window. This cleaning operation may be effected after each milking turn, the frequency of cleaning the window may be lower when it is found that the window is contaminated less frequently.

The motion of the component parts of the robot arm and the motion of the detector can be performed by means of computer-controlled stepping motors. Both for this function and in general for controlling the entire milking procedure and the procedure of automatically connecting and disconnecting the teat cups, a computer is used.

The apparatus further includes an animal identification system connected to this computer, the computer having stored in it a control program adapted to the individual animals for moving the detector to an animal-specific position under the udder. The position from which the detector can detect in the most accurate manner the position of the teats of the animal, depends on the position of the teats and will consequently depend on the physiological characteristics of individual animals. After the position of the teats has been determined, the teat cups can be connected. The apparatus is arranged so that optionally the four teat cups can be coupled simultaneously or one after the other to the teats of an animal. The teat cups are uncoupled from the teats individually. The invention, therefore, further relates to a method of automatically milking animals, such as cows, using a milking robot with teat cups, in which the four teat cups are automatically coupled simultaneously or one after the other to the teats of an animal, while the teat cups can also be coupled individually.

BRIEF DESCRIPTION OF THE DRAWINGS

For a better understanding of the invention and to show how the same may be carried into effect, reference will now be made, by way of example, to the accompanying drawings, in which:

FIG. 1 is a side elevational view of a milking compartment in accordance with the invention with a cow shown therein in dashed lines;

FIG. 2 is a rear elevational view of a milking robot, a teat cup being connected to a teat of an animal shown in dashed lines standing in the milking compartment;

FIG. 3 is a rear elevational view of the milking robot, wherein the teat cups are connected to the teats of an animal shown in dashed lines in the milking compartment and wherein the robot arm is thereafter retracted to outside the milking compartment;

FIG. 5 is a side elevational view of a milking compartment accommodating a cow, of which the front and rear teats are at unequal heights, and in which figure a detector is shown in the position in which it can determine the location of the rear teats; and FIG. 6 is a plan view of the milking compartment shown in FIG. 5 containing the detector, and illustrating the manner in which it is movable and cleanable.

DESCRIPTION OF THE PREFERRED EMBODIMENTS

Figure 4:
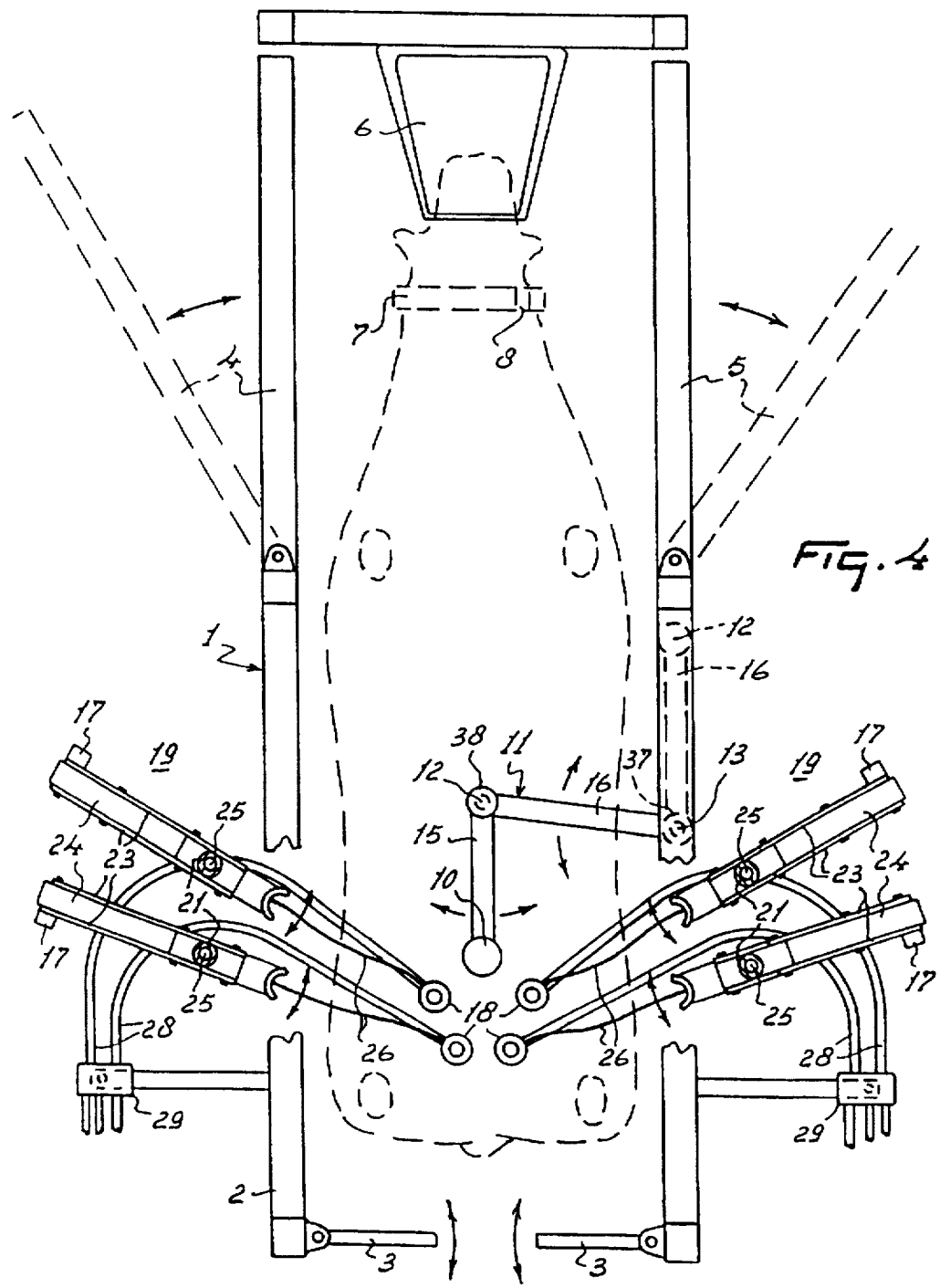
FIG. 4 is a plan view of the milking compartment with the milking robot, wherein all four teat cups have been connected to the teats of an animal which is shown in dashed lines standing in the milking compartment and wherein the robot arms have thereafter been retracted to outside the milking compartment.

FIG. 1 shows, in a side elevational view, a milking compartment 1 in which a cow to be milked is present. Milking compartment 1 includes a framework 2 which surrounds the milking compartment at all four sides, an entrance door 3 at the rear side and two exit doors 4 and 5 having been arranged in the compartment's framework at the two longitudinal sides (see FIG. 4). Via one of these exit doors the animal can be conducted from the milking compartment to a shed area or a pasture, while via the other door the animal can be conducted to a special isolation area, e.g. because mastitis has been detected during milking. The entrance and exit doors are under the control of a computer system, not shown. At the leading side of milking compartment 1 a feeding trough 6 has been disposed, which is part of an automatic feeding system. The animals to be milked wear a collar 7, which is equipped with a transponder 8 that cooperates with a sensor 9 disposed at or near feeding trough 6. When an animal enters milking compartment 1 and has advanced sufficiently that it can put its head into feeding trough 6, the distance between transponder 8 and sensor 9 is such that communication between the two elements 8 and 9 occurs. Transponder 8 and sensor 9, which is connected to the computer system, constitute an animal identification system. As soon as communication between transponder 8 and the sensor 9 becomes possible, the animal is identified and a file stored for this animal in the memory of the computer system becomes accessible, which file includes various data, such as data for the automatic supply of food, the automatic connection of the teat cups and the subsequent automatic milking operation and for monitoring the health condition of this animal.

After the animal has entered milking compartment 1 and has been identified therein, a detector 10, here in the form of a laser detector, is moved to under the animal. In the FIGS. 1 and 4, detector 10 is disposed on a robot arm system 11, formed by robot arms 15 and 16 which are pivotal about cylindrical vertical shafts indicated by reference numerals 12 and 13, this robot arm system 11 being attached to framework 2 in such a manner that it is pivotal about shaft 13. Robot arms 15 and 16 are pivotal with the aid of computer-controlled motors 37 and 38, for which stepping motors are preferably employed. Using detector 10, the position of the teats relative to milking compartment 1 can be determined, whereafter teat cups 18 can be fitted on the teats. Detector 10 and the means for fitting teat cups 18 to the teats together form a milking robot. In the embodiment shown, these means include a separate robot arm construction 19 for each of the teat cups 18. Such a robot arm construction 19 includes a first four-bar parallelogram linkage 20, with the aid of which a vertical carrier 21 is connected which is capable of moving in vertical directions relative to frame portions 22 of framework 2. The pivotal shafts, by means of which this four-bar linkage is connected to the frame portions, are denoted by reference character 20A. At the lower side of carrier 21 there is a second four-bar parallelogram linkage 23, with the aid of which a robot arm 24 is movable from outside the milking compartment 1 into the milking compartment to under an animal present therein and can again be retracted to outside the milking compartment. This robot arm 24 is furthermore pivotal about a vertical shaft indicated by reference numeral 25 relative to carrier 21. Each of robot arms 24 acts as a carrier for one or more teat cups 18. By means of first and second four-bar linkages 20 and 23, respectively, and the pivotal construction about shaft 25, teat cup 18 connected to robot arm 24 can be moved omnidirectionally. In the embodiment shown, the pivotal motion of robot arm 24 relative to shaft 25 is provided by a computer-controlled motor 14, the reciprocal motion of robot arm 24 relative to carrier 21 by a computer-controlled motor 17, while the up-and-down motion is provided with the aid of the first four-bar linkage by a computer-controlled operating cylinder/piston combination 41, preferably a pneumatic cylinder/piston combination. Motors 14 and 17 are preferably stepping motors.

A teat cup 18 is connected to a corresponding robot arm 24 by means of a flexible element, such as a cord 26, which cord is not only connected to a teat cup 18 but also to an operating cylinder/piston combination, preferably a pneumatic cylinder/piston combination, accommodated in each robot arm 24. If, as is shown in FIG. 2, a teat cup 18, carried by robot arm 24, is fitted on a teat, then, as soon as teat cup 18 has been drawn onto the teat with the aid of the vacuum produced therein, the cylinder/piston combination accommodated in robot arm 24 is activated to extend cord 26, robot arm 24 is retracted to outside milking compartment 1 and teat cup 18 remains connected to robot arm 24 only loosely by cord 26 and will, therefore, have a sufficient freedom of movement to track the animal's movements. In this situation, it may happen that teat cups 18 are inhibited in their free motion capability by milk tubes 27 and possibly by pulsation tubes 28, more in particular when these tubes have been secured to the robot arm construction 19. It is, therefore, advantageous for tubes 27 and 28 to move as freely as possible and not hamper teat cups 18 when they follow the animal's movements. To that end, tubes 27 and 28 connected to teat cups 18 extend during milking, as seen in plan view, from the teat cups to which these tubes are connected, obliquely forwardly in the direction that the animal faces and outwardly and thereafter the tubes loop farther outwardly and rearwardly (see FIG. 4). From the teat cups tubes 27 and 28 thus extend outwardly on both sides of the milking compartment and back along each side of the milking compartment. The tubes extend generally in a "U" shape to points of connection 29, provided at the side of the milking compartment to receive tubes 27 and 28. The loop-shaped arrangement of the tubes increases the free motion capability of the teat cups. The further milk lines and vacuum lines of the milking system are connected in the same manner to their respective points of connection. Because two robot arm constructions 19 are disposed on both sides of the milking compartment 1, only one point of connection 29 is sufficient for each side. Of course, alternatively there may be a point of connection for tubes 27 and 28 of each robot arm construction. Since the robot arms 24 are movable from outside the compartment obliquely rearwardly and inwardly to under the animal, the tubes 27 and 28 first extend from a corresponding teat cup approximately in the same direction as in which the relevant robot arm 24 is disposed, whereafter the tubes curve transversely and rearwardly underneath the robot arm to the relevant point of connection 29. Because between teat cups 18 and points of connection 29 the tubes are not connected to anything else, they can move freely near the milking compartment floor. Consequently, they occasion only slight resistance and do not to any significant extent obstruct the motion of the teat cups. When the teat cups have been connected to the teats, then the tubes 27 and 28 generally extend in a horizontal plane and the tubes are movable in this plane (see FIG. 3). When the teat cups are to be uncoupled, then, because of the fact that the robot arms have been moved to outside the milking compartment during milking, these robot arms must first be moved towards the teat cups, while simultaneously or shortly thereafter the operating cylinder/piston combinations in robot arms 24 are energized in order to retract cords 26 and pull the teat cups up against the holder at the end of robot arm 24. Since there are four robot arm constructions 19 which operate independently of each other, the teat cups can be coupled simultaneously or one after the other and independently of each other to the teats of an animal. Also uncoupling of a teat cup can be effected independently of the other teat cups.

When, after the milking operation has ended, a teat cup 18 has been pulled up against a relevant robot arm 24 and this arm has thereafter been returned to its position of rest outside the milking compartment, the teat cup can be automatically cleaned in this rest position. To that end (see FIGS. 1 to 3), spray heads 42 connected to a washing circuit (not shown) are positioned at or near both sides of the milking compartment. Teat cups 18 are connectable independently of each other to these spray heads 42, more in particular when robot arms 24 carrying teat cups 18 have been moved to their position of rest.

In contrast to the cow standing in the milking compartment shown in FIG. 1, the cow in the milking compartment shown in FIG. 5 has teats which are at unequal heights. It regularly happens that cows have teats which are located very closely next to each other or are at different heights or both. Because of the advantageous construction of a separate robot arm structure for detector 10 in accordance with the invention, it becomes possible to determine the position of such teats. Such a robot arm structure for detector 10 is illustrated in FIGS. 5 and 6. The means for the connection of the teat cups have been omitted from these drawings. Detector 10 is located on a robot arm structure 30, which is of such a design that the detector is omnidirectionally or substantially omnidirectionally movable in the milking compartment. Detector 10 is connected via a four-bar parallelogram linkage 31 to a robot arm 32, which is part of the robot arm structure 30. Robot arm 32 is pivotal about a vertical shaft indicated by reference numeral 33, arranged at the side of milking compartment 1. Four-bar linkage 31 is connected so as to be capable of pivoting about a vertical shaft indicated by reference numeral 34 to robot arm 32. Detector 10 is further connected, capable of pivoting about its own longitudinal shaft indicated by reference numeral 35, to four-bar linkage 31 (see FIG. 5). Because of the feature that it is pivotal about the shafts 33, 34 and 35 and the feature that it is movable in height with the aid of the four-bar linkage 31, detector 10 can move around the teats in all positions and more particularly always to a position that the teats can be detected, whatever their positions relative to each other may be. Four-bar linkage 31 and the pivotability of detector 10 about its own longitudinal shaft 35 makes it possible for the detector to effect a scanning motion in different directions, so that teats differing from normal teats can be detected. The scanning motion in the upward direction can then be effected through at least approximately five centimeters and can preferably amount to approximately ten centimeters in the vertical direction. Should there be animals of which the difference in height between the front and rear teats of the udder is still larger, then the pivotal motion can be adapted thereto.

In the present invention, the detector is constituted by a laser detector and positioned as such in a housing having a window, through which the laser beam is transmitted. When this window gets dirty, the detection of the teats may not be sufficiently accurate. It is, therefore, important to provide the apparatus with means, with which detector 10 can be cleaned. To enable cleaning in an efficient manner, the pivotal motion about shafts 33 and 34 is such that detector 10 can be moved to outside milking compartment 1 to a cleaning position, as indicated by broken lines in FIG. 6. In this position, the detector can then be cleaned using a cleaning member 36 provided for that purpose. This cleaning member 36 may include spraying or blowing means or both for spraying a cleaning agent or blowing air or both against the window of detector 10, respectively.

Performing the pivotal motions about shafts 33 and 34 and a motion in vertical directions by means of four-bar linkage 31, as well as the rotation of detector 10 about its own longitudinal shaft, are monitored by computer-controlled motors, preferably stepping motors 37, 38, 39 and 40. Although in many cases the detector can be placed in a fixed working position, shown in FIG. 6, it may sometimes be necessary for detector 10 to be operative in a plurality of positions to enable a determination of the position of the various teats. Thus, it may be necessary for detector 10 to be arranged for the determination of the position of the front teats in a first working position in the midway point between and before the leading teats, whereas for the determination of the position of the trailing teats the detector must be placed in a position farther to the rear. It may alternatively be possible that the detector should not be arranged in the midway point between the teats, but more to the side; the latter will more specifically be the case when one teat would be in the shadow of the other teat relative to the detector or when two teats are very close to each other. Since the relative position of the teats of the several animals is known, this can be taken into account on arranging the detector in the working position under the animal. The computer system may include a control program adapted to the individual animals for moving the detector to an animal-specific position under the udder, which control program can be addressed with the aid of the animal identification system for the relevant animal. This animal-attuned control program can be triggered on the basis of data present in the computer system in the data file for each animal. Detector 10 consequently has a position of rest (indicated by broken lines in FIG. 4), as well as a cleaning position (see FIG. 6) and one or more working positions adapted to the individual animals.

The invention is not limited to the embodiments disclosed herein, but also extends to modifications which would occur to a person skilled in the art and which are within the scope of the following claims:

Having disclosed my invention, what I claim is new and to be secured by Letters Patent of the United States is:

1. An apparatus for automatically milking animals, such as cows that comprises milking compartments,
    a milking robot including teat cups of the animals, said teat cups being supported by a robot arms means;
    a detector that generates beams and uses their reflections for determining the positions of the teats, said detector being disposed on a robot arms construction spacially separated from said robot arm means, said robot arm construction comprising omni-directing means for maneuvering said detector so that said detector's beams can be aimed at different angles with respect to the teats of the animal to be milked, and whereby said omni-direction further comprises scanning means for performing a scanning motion in different directions.

2. An apparatus in accordance with claim 1 wherein said omnidirecting means functions to move said detector substantially vertically and substantially horizontally.

3. An apparatus in accordance with claim 1 wherein said scanning means performs the function of detecting the teats of an animal in said compartment wherein such teats are at different heights above the floor of said milking compartment.

4. An Apparatus in accordance with claim 1 wherein said scanning means performs the function of scanning approximately ten centimeters in the vertical direction.

5. An apparatus in accordance with claim 1 wherein said omnidirecting means comprises a four-bar linkage and a robot arm to which said four-bar linkage is connected.

6. An apparatus in accordance with claim 1 wherein said omnidirecting means performs the function of moving said detector substantially in a horizontal plane.

7. An apparatus in accordance with claim 6 wherein said omnidirecting means comprises a substantially vertical shaft, said detector being pivotally movable relative to said substantially vertical shaft.

8. An apparatus in accordance with claim 1 wherein said robot arm construction is supported from proximate a longitudinal side of said milking compartment.

9. An apparatus in accordance with claim 1 wherein said omnidirecting means is movable from inside to outside of said milking compartment and vice versa.

10. An apparatus in accordance with claim 1 wherein said omnidirecting means comprises a computer-controlled stepping motor.

11. An apparatus in accordance with claim 10 comprising a computer-controlled animal identification system which cooperates with said omnidirecting means to move said detector under the identified animal in said milking compartment.

12. An apparatus for automatically milking animals, such as cows, comprising a milking compartment, a milking robot including teat cups for automatically connecting said teat cups to the teats of the animals, a detector for determining the position of the teats, and a cleaning means for cleaning said detector.

13. An apparatus in accordance with claim 12 wherein said milking compartment comprises a longitudinal side and said cleaning means is associated with said longitudinal side so as to be disposed outside of said milking compartment.

14. An apparatus in accordance with claim 12 comprising a cleaning fluid, said cleaning means performing the function of spraying said cleaning fluid against said detector.

15. An apparatus in accordance with claim 14 wherein said detector comprises a laser and a window, said cleaning means spraying said cleaning fluid against said window.

16. An Apparatus for automatically milking animals, such as cows, that comprises milking compartments, a milking robot including teat cups for automatically connecting said teat cups to the teats of the animals, and a detector that generates beams and uses their reflections for determining the positions of the teats, said detector being disposed on a separate robot arm construction, said robot arm construction comprising omnidirecting means for maneuvering said detector so that said detector's beams can be aimed at different angles with respect to the teats of the animal to be milked, and the apparatus further comprising cleaning means for performing the function of cleaning said detector.

\* \* \* \* \*